United States Patent
Kambhaluru et al.

(10) Patent No.: US 11,009,335 B2
(45) Date of Patent: May 18, 2021

(54) WHEEL ADAPTER

(71) Applicant: Beissbarth GmbH, Munich (DE)

(72) Inventors: Vikranth Kambhaluru, Bangalore (IN); Stefanie Peters, Darmstadt (DE); Trendafil Ilchev, Munich (DE)

(73) Assignee: Beissbarth GmbH, Munich (DE)

( * ) Notice: Subject to any disclaimer, the term of this patent is extended or adjusted under 35 U.S.C. 154(b) by 117 days.

(21) Appl. No.: 16/307,408

(22) PCT Filed: Aug. 10, 2017

(86) PCT No.: PCT/EP2017/070298
§ 371 (c)(1),
(2) Date: Dec. 5, 2018

(87) PCT Pub. No.: WO2018/046222
PCT Pub. Date: Mar. 15, 2018

(65) Prior Publication Data
US 2019/0310066 A1    Oct. 10, 2019

(30) Foreign Application Priority Data

Sep. 12, 2016 (DE) .......................... 102016217290.5

(51) Int. Cl.
*G01B 5/255* (2006.01)
(52) U.S. Cl.
CPC .................... *G01B 5/255* (2013.01)
(58) Field of Classification Search
CPC ................ G01B 5/255; G01B 21/26
USPC ...................................... 33/203.18
See application file for complete search history.

(56) References Cited

U.S. PATENT DOCUMENTS

| 1,542,133 | A |   | 6/1925  | Heineke  |             |
|-----------|---|---|---------|----------|-------------|
| 2,582,427 | A | * | 1/1952  | Greenleaf | B29C 73/24 |
|           |   |   |         |          | 33/203.15   |
| 2,702,432 | A | * | 2/1955  | Martin   | G01B 5/255  |
|           |   |   |         |          | 33/203.13   |
| 4,569,140 | A | * | 2/1986  | Hobson   | G01B 5/255  |
|           |   |   |         |          | 33/203.18   |
| 5,052,111 | A | * | 10/1991 | Carter   | G01B 5/255  |
|           |   |   |         |          | 33/203.18   |

(Continued)

FOREIGN PATENT DOCUMENTS

| DE | 10242536   | B3  |   | 4/2004  |            |
|----|------------|-----|---|---------|------------|
| EP | 1231451    | A1  | * | 8/2002  | G01B 5/255 |
| FR | 3016691    | A1  |   | 7/2015  |            |

OTHER PUBLICATIONS

International Search Report for PCT/EP2017/070298, dated Oct. 9, 2017.

*Primary Examiner* — Christopher W Fulton
(74) *Attorney, Agent, or Firm* — Norton Rose Fulbright US LLP; Gerard A. Messina; Dervis Magistre

(57) ABSTRACT

A wheel adapter for fastening on a wheel, in particular on a wheel of a motor vehicle, includes at least two arms which extend in a radial direction starting from a central area of the wheel adapter Each of the arms includes at least one movable element which is movable in the radial direction in order to vary the length of the arm in the radial direction. The movable elements of at least two arms are mechanically coupled to one another in such a way that a movement of one movable element of a first arm results in a corresponding movement of a least one movable element of a second arm.

12 Claims, 2 Drawing Sheets

(56) References Cited

U.S. PATENT DOCUMENTS

| | | | | |
|---|---|---|---|---|
| 5,056,231 A | * | 10/1991 | Alusick | G01B 11/275 33/203.18 |
| 5,311,668 A | * | 5/1994 | Longa | G01B 5/255 33/203.12 |
| 5,369,602 A | * | 11/1994 | Naas | G01B 5/0025 33/203.18 |
| 9,228,819 B2 | * | 1/2016 | Pruitt | G01B 5/255 |
| 2012/0313334 A1 | * | 12/2012 | Hartman | B60S 13/00 280/3 |

* cited by examiner

WHEEL ADAPTER

FIELD OF THE INVENTION

The present invention relates to a wheel adapter, in particular to a wheel adapter for vehicle measurement, and a method for mounting such a wheel adapter on a wheel of a vehicle, in particular of a motor vehicle.

BACKGROUND INFORMATION

For vehicle measurement, wheel adapters, which may carry sensors and/or reference marks ("targets"), are often mounted on the wheels of the vehicle to be measured. The handling of such wheel adapters, in particular their mounting on and removal from the wheels of the vehicle, is complex and difficult. In particular, multiple steps are necessary which must be carried out using two hands. An incorrect and/or imprecise mounting of a wheel adapter may result in false measurement results during the chassis measurement.

SUMMARY

It is an object of the present invention to simplify the mounting of a wheel adapter on the wheels of a vehicle.

According to one exemplary embodiment of the present invention, a wheel adapter, which is designed for fastening on a wheel, in particular on a wheel of a motor vehicle, includes at least two arms which extend outward in a radial direction from a central area of the wheel adapter. Each of the arms includes at least one moveable element which is movable in the radial direction in order to vary the length of the respective arm in the radial direction. The movable elements of at least two arms are mechanically coupled to one another in such a way that a movement of one movable element of a first arm results in a corresponding movement of at least one movable element of a second arm.

According to one exemplary embodiment of the present invention, a method for mounting a wheel adapter on a wheel, in particular on a wheel of a motor vehicle, includes the steps:
fixing a first movable element of a first arm of the wheel adapter on a first point of the wheel;
moving the wheel adapter so that the at least one movable element of the first arm is moved in such a way that the first arm extends; and
fixing at least one second movable element of a second arm on a second point of the wheel.

By exerting a tug on at least one arm of the wheel adapter, the other arms simultaneously extend equally outward and thus facilitate an automatic adaptation of the arm length to different wheel or tire sizes without necessitating an additional interaction of the user. For this purpose, the wheel adapter is hung, for example, in an upper area of the wheel (e.g., the upper tread, the wheel rim, or the rim flange) and, if necessary, moved with the support of gravity in the direction of the wheel center. This facilitates a simple and effortless mounting of the wheel adapter on the wheel.

A wheel adapter according to the present invention is mountable on the wheel using only one hand. In this way, the complexity and the time required for mounting the wheel adapter are significantly reduced.

In one specific embodiment, the movable elements of all arms are mechanically coupled to one another in such a way that a movement of one movable element of a first arm results in a corresponding respective movement of at least one movable element of all other arms. The simultaneous adaptation of the arm lengths of all arms results in an unambiguously defined position of the wheel adapter with respect to the wheel axle, as is important for an accurate axle measurement.

In one specific embodiment, the movable elements are coupled to one another by a cable pull or a belt. A cable pull or belt facilitates a simple and reliable mechanical coupling of the movable elements.

In one specific embodiment, the wheel adapter includes at least one automatic retraction mechanism, which is designed to move the movable elements of the arms in the direction of the central area. In this way, the wheel adapter may be securely (pre)fixed on the wheel. In the unused state, the arms of the wheel adapter are automatically retracted. This reduces the space required for storing the wheel adapter and reduces the risk of damage.

In one specific embodiment, the automatic retraction mechanism includes at least one elastic mechanical element, for example, a spring. With the aid of this type of elastic element, a cost-efficient and reliable retraction mechanism may be implemented.

In one specific embodiment, the automatic retraction mechanism includes at least one electric motor. A retraction mechanism that includes an electric motor may be controlled in a targeted manner, in particular, the force, with which the arms of the wheel adapter are drawn in the direction of the central area, may be correctly modulated by controlling the electric motor.

In one specific embodiment, the arms of the wheel adapter are designed with stationary rail elements and with movable rail elements, which are movable with respect to the stationary rail elements. Rail elements movable relative to one another provide mechanically stable arms with variable lengths.

In one specific embodiment, the arms of the wheel adapter are designed with drawer slide assemblies. Drawer slide assemblies provide mechanically stable arms, whose length may be easily adjusted.

In one specific embodiment, the arms of the wheel adapter are designed with telescoping slides and/or with telescope bars. Telescoping rails and/or telescope bars provide mechanically stable arms, whose length may be easily adjusted.

In one specific embodiment, the wheel adapter additionally includes a locking mechanism, which facilitates the fixing of the movable elements in at least one position. In this way, the wheel adapter may be fixed on the wheel with the precision and stability necessary for the vehicle measurement.

One exemplary embodiment of a wheel adapter according to the present invention will be subsequently described in greater detail with reference to the appended drawings.

DETAILED DESCRIPTION

Figure 1:
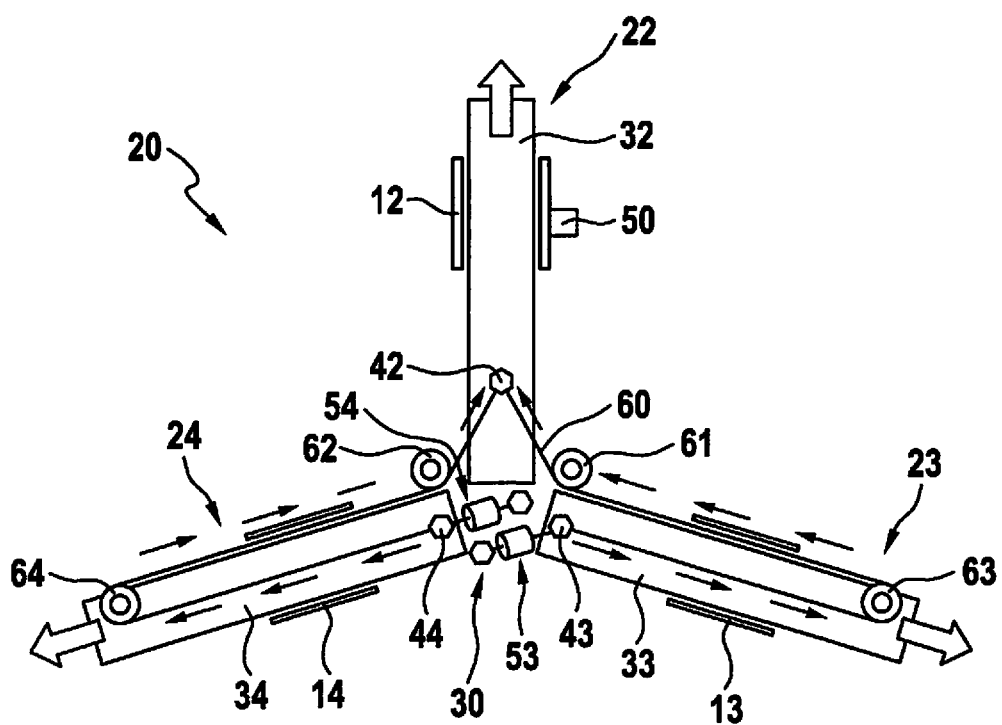
FIG. 1 shows a schematic front view of a wheel adapter according to one exemplary embodiment of the present invention.

FIG. 1 shows a schematic front view of a wheel adapter 20 according to one exemplary embodiment of the present invention.

Wheel adapter 20 shown in FIG. 1 has three arms 22, 23, 24, which extend outward in a radial direction from a central area 30 of wheel adapter 20. Arms 22, 23, 24 may have identical angular distances from one another or, as shown in FIG. 1, different angular distances. Wheel adapter 20 may also include more or fewer than three arms 22, 23, 24.

Each of arms 22, 23, 24 respectively has a stationary element 12, 13, 14 (shown only schematically in FIG. 1) and a movable element 32, 33, 34 which is movable in the radial direction with respect to the respective stationary element 12, 13, 14. The length of arms 22, 23, 24 is thus variable in the radial direction by moving movable elements 32, 33, 34.

Movable elements 32, 33, 34 are coupled to one another by a cable pull/belt 60, which is guided via multiple rollers 61, 62, 63, 64 and is connected to movable elements 32, 33, 34 at fixing points 42, 43, 44. Rollers 61, 62, 63, 64 are situated in areas on the ends of arms 22, 23, 24.

This coupling has the effect that a movement of a first movable element 32 of first arm 22 in the radial direction results in a corresponding movement of movable elements 33, 34 of second and third arms 23, 24. Thus, the diameter/circumference of wheel adapter 20, which is predefined by the outer ends of arms 22, 23, 24, is symmetrically variable by moving movable element 32 of first arm 22.

The ends of cable pull/belt 60 are elastically fixed by elastic elements, e.g., spring elements 53, 54. Thus, movable elements 32, 33, 34 are pulled by elastic elements 53, 54 in the direction of central area 30, if no forces acting outwardly in the radial direction are exerted on movable elements 32, 33, 34. Thus, the diameter/circumference of wheel adapter 20 is minimized in the "rest state", i.e., when no forces acting outwardly in the radial direction are exerted on movable elements 32, 33, 34.

Wheel adapter 20 additionally includes at least one locking mechanism 50, which is designed to fix at least one movable element 32, 33, 34 in a desired position. This facilitates secure fastening of wheel adapter 20 on a wheel (not shown in FIG. 1).

Figure 2A:
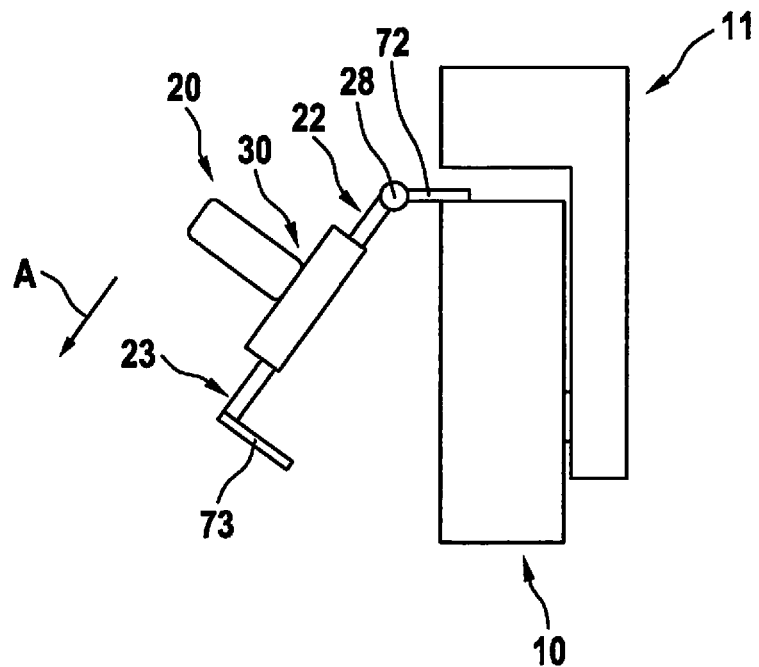
FIGS. 2a and 2b illustrate the mounting of a wheel adapter according to one exemplary embodiment of the present invention on a wheel.
Figure 2B:
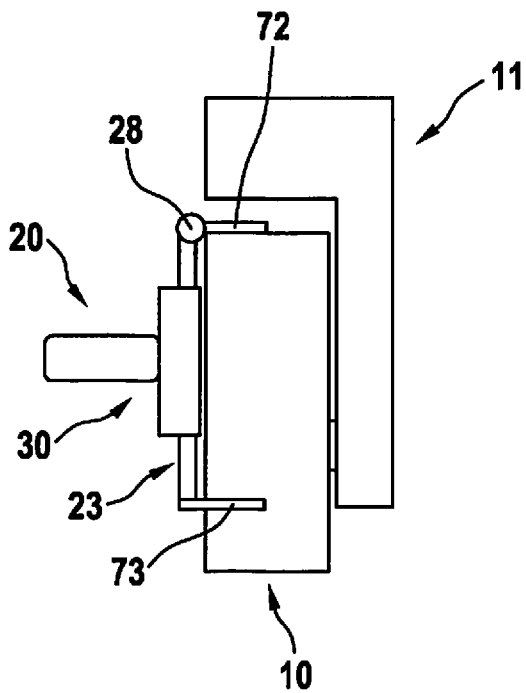

FIGS. 2a and 2b schematically illustrate the mounting of a wheel adapter 20 according to one exemplary embodiment of the present invention on a wheel 10, which is provided on a schematically depicted body 11 of a vehicle.

A first claw 72 is provided on a first arm 22 of wheel adapter 20 and is designed for fastening first arm 22 on wheel 10. First claw 72 is provided to be movable on first arm 22, in particular due to a joint 28, in order to simplify the mounting of wheel adapter 20 on wheel 10.

After first claw 72 has been fixed on a first area of wheel 10, e.g., on its tread, the wheel rim, or the rim flange, wheel adapter 20, if necessary by exploiting gravity, is pulled away from the fastening point (in direction A in FIG. 2a). Thus, first arm 22 is extended, movable element 32 of first arm 22 being moved with respect to stationary element 12 of first arm 22.

Due to the mechanical coupling of movable elements 32, 33, 34 by cable pull/belt 60, previously described in connection with FIG. 1, movable elements 33, 34 of second and third arms 23, 24 also move simultaneously equally outward so that the diameter/circumference of wheel adapter 20 to central area 30 symmetrically increases.

As soon as the diameter/circumference necessary for mounting wheel adapter 20 on wheel 10 is reached, claws 73 of second and third arms 23, 24 are fixed on corresponding points, e.g., on the tread, the wheel rim, or the rim flange of wheel 10 (see FIG. 2b).

If no force acting outwardly in the radial direction is exerted on arms 22, 23, 24, then elastic elements 53, 54 of the retraction mechanism pull movable elements 32, 33, 34 in the direction toward central area 30. Thus, wheel adapter 20 is securely clamped on wheel 10 and thus (pre)fixed.

By locking the at least one locking mechanism 50, at least one of movable elements 32, 33, 34 is securely fixed with respect to associated stationary element 12, 13, 14. Thus, the stable connection of wheel adapter 20 to wheel 10, necessary for the axle measurement, is ensured, even if the vehicle is moved.

After the measurements have been concluded, the at least one locking mechanism 50 is opened and wheel adapter 20 is removed from wheel 10.

Elastic elements 53, 54 of the retraction mechanism have the effect that movable elements 32, 33, 34 of arms 22, 23, 24 are pulled back in the direction of central area 30, so that wheel adapter 20 may be transported and stored in a compact state with a minimal diameter/circumference.

Instead of elastic elements 53, 54, (electric) motors 53, 54 may also be provided which are designed to pull arms 22, 23, 24 back in the direction of central area 30.

What is claimed is:

1. A wheel adapter for fastening on a wheel, comprising:
    at least two arms that extend from a central area of the wheel adapter in a radial direction, wherein:
        each of the at least two arms includes at least one respective movable element,
        each movable element is movable in the radial direction in order to vary a length of an associated one of the arms in the radial direction, and
        the movable elements of the at least two arms are mechanically coupled to
    one another by at least one of a cable pull and a belt in such a way that a movement of one of the movable elements of a first arm of the at least two arms in the radial direction results in a corresponding movement of another movable element of a second arm of the at least two arms.

2. The wheel adapter as recited in claim 1, wherein the wheel adapter is configured to be fastened to a wheel of a motor vehicle.

3. The wheel adapter as recited in claim 1, wherein the movable elements are mechanically coupled to one another in such a way that a movement of the one of the movable elements of the first arm results in a corresponding respective movement of at least one movable element all other arms of the at least two arms.

4. The wheel adapter as recited in claim 1, further comprising:
    at least one retraction mechanism for moving the movable elements in a direction of the central area.

5. The wheel adapter as recited in claim 4, wherein the retraction mechanism includes at least one elastic mechanical element.

6. The wheel adapter as recited in claim 5, wherein the elastic mechanical element includes at least one of a spring and an electric motor.

7. The wheel adapter as recited in claim 1, wherein the arms include stationary rail elements and movable rail elements.

8. The wheel adapter as recited in claim 1, wherein the arms include drawer slide assemblies.

9. The wheel adapter as recited in claim 1, wherein the arms includes at least one of telescoping slides and telescope bars.

10. The wheel adapter as recited in claim 1, further comprising:

at least one locking mechanism that facilitates a fixing of at least one of the movable elements in at least one position.

11. A method for mounting a wheel adapter on a wheel, the wheel adapter including at least two arms that extend from a central area of the wheel adapter in a radial direction, wherein each of the at least two arms includes at least one respective movable element, wherein each movable element is movable in the radial direction in order to vary a length of an associated one of the arms in the radial direction, and wherein the movable elements of the at least two arms are mechanically coupled to one another by at least one of a cable pull and a belt in such a way that a movement of one of the movable elements of a first arm of the at least two arms in the radial direction results in a corresponding movement of another movable element of a second arm of the at least two arms, the method comprising:

fixing a first one of the movable elements of the first arm of the wheel adapter on a first point of the wheel;

moving the wheel adapter so that the first movable element of the first arm is moved in such a way that the first arm extends in the radial direction; and fixing a second one of the movable elements of the second arm on a second point of the wheel.

12. The method as recited in claim 11, wherein the wheel adapter is configured to be fastened to a wheel of a motor vehicle.

* * * * *